May 17, 1949.  G. F. BROWN  2,470,685
WHEEL AND TIRE APPLYING DEVICE
Filed Oct. 1, 1945

INVENTOR.
GEORGE F. BROWN
BY Fisher & Christen,
Attorneys.

Patented May 17, 1949

2,470,685

UNITED STATES PATENT OFFICE 2,470,685

WHEEL AND TIRE APPLYING DEVICE

George F. Brown, Tulsa, Okla.

Application October 1, 1945, Serial No. 619,645

5 Claims. (Cl. 280—36)

The invention relates to an improvement in a lift or truck used in mounting a tire and wheel or wheel, on any vehicle, in which leverage and a roller or rollers are used to place and raise a tire and wheel or wheel into position for attaching to the vehicle with much less effort and discomfort than has formerly been used and needed.

The principal object of the invention is to provide a lift or small truck, on which a tire, or tire and wheel, may be supported and moved, for use in changing a tire, or tire and wheel, on a motor vehicle. The truck is of simple, strong and sturdy construction; it is provided with a ground roller, so that it may be readily moved into operative position, and is provided with a handle by means of which the operator can raise or lower the truck to the proper level with respect to the axle, for changing the tire, or tire and wheel. While the truck is useful for all sizes of tires and wheels, it is particularly useful in handling the heavier tires and wheels of large cars and particularly the heavy tires and wheels of motor trucks.

More specifically, the truck or lift comprises a main frame for receiving the tire, provided at one end with a roller or wheel, and at the other end with a manipulating handle, which the operator lifts to raise the tire, this handle being pivoted to the frame and forming a lever of sufficient length so that the operator may readily raise or lower the tire, even if it is very heavy. This operating lever may be folded into or alongside the main frame, so that it may readily be carried in the baggage or tool compartment of the car.

Further details of the invention will now be described in connection with the accompanying drawings, in which.

Figure 1:
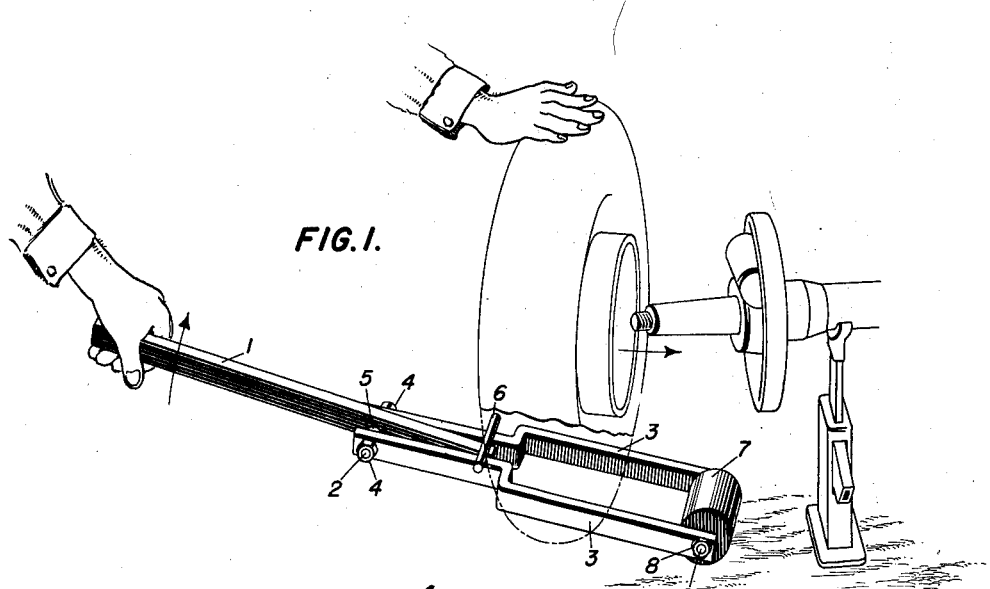
Fig. 1 is a perspective view, showing the truck in use.
Figure 2:
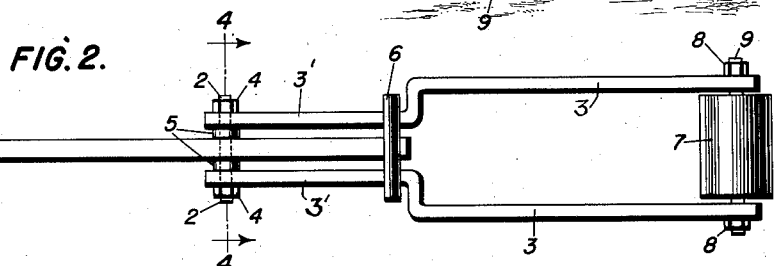
Fig. 2 is a plan view of the truck.

Referring now to these drawings, a control handle or lever 1 is secured as by welding, to a bolt or pivot 2, which pivot passes through suitable holes in the ends of frame arms 3', 3'. Arms 3', 3' are formed as extensions of a main supporting frame 3, 3. Arms 3, 3 and 3', 3' form a bifurcated frame.

The pivot bolt 2 is provided with nuts 4, and with washers or bushings 5, 5, and is rotatable in the ends of arms 3', 3'.

A cross bar 6 is welded to the top of the inner end of handle 1, and is of a width to bear against the top of each of arms 3', 3'.

In the outer ends of main frame members 3, 3 is mounted a roller 7, on an axle 9, held in place by nuts 8. Roller 7 forms a single wheel, but two wheels could, of course, be used instead of a roller and the term roller as used in the claims is intended to include wheels.

The truck is used by rolling the tire, or tire and wheel onto frame members 3, 3, the operator having one hand on the control handle 1, and balancing the tire with the other, as in Fig. 1. The tire is then rolled to position near the end of the vehicle axle, and the operator lifts handle 1 sufficiently to bring the axle opening in the wheel to the level of the axle. Then the operator moves the truck on its roller 7 toward the axle and so applies the wheel. Removal of the wheel is effected by reversing these steps.

Figure 3:
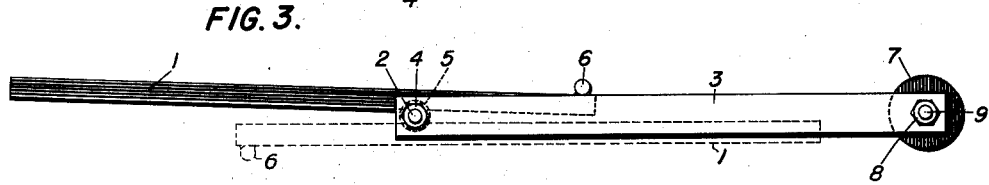
Fig. 3 is a side view of the truck.
Figure 4:
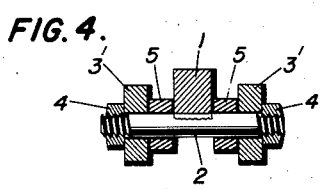
Fig. 4 is a cross-section, on the line 4—4 of Fig. 2.
Figure 5:
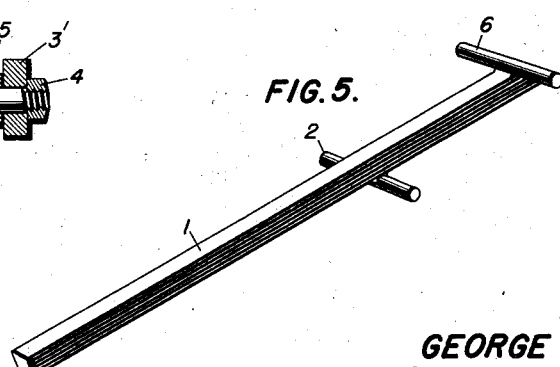
Fig. 5 is a perspective view of the control lever or handle.

When not in use, the handle 1 may be folded by swinging it counterclockwise about its pivot, as shown in dotted lines in Fig. 3 and the truck stored in the baggage or tool compartment.

While the invention has been described in some detail, it should be understood that the invention is not limited to the particular details shown, but may be carried out in other ways.

I claim as my invention:

1. A truck for use in applying or removing tires and wheels, comprising a bifurcated frame including a pair of spaced arms for receiving the tire or wheel, roller means journaled in said arms at one end thereof, an operating lever pivoted intermediate its ends, to said spaced arms at the other end thereof, and abutment means, carried by the inner end of said lever, engageable against the upper part of said arms when said operating lever is moved about its pivot, whereby a lift applied to the outer end of the operating lever serves to lift the frame and to lift the tire or wheel positioned thereon.

2. A truck for use in applying or removing tires and wheels, comprising a frame comprising a pair of spaced frame members for receiving the tire or wheel, roller means carried by said frame at one end thereof, spaced arms integral with said frame members and forming extensions thereof, a lever pivoted intermediate its ends in the ends of said arms, and a cross bar carried by the inner end of said lever and extending across said arms and engageable therewith, whereby a lift applied to the outer end of the lever lifts the entire frame and the tire or wheel positioned thereon.

3. A truck for use in applying or removing tires and wheels, comprising a pair of spaced, substantially parallel frame members, for receiving the tire or wheel, roller means carried by said frame members at one end thereof, an operating lever pivoted intermediate its ends between said frame members at the other end thereof, a cross bar carried by the inner end of said operating lever and engageable with the top of the frame, whereby a lift on the outer end of the lever serves to lift the frame and whereby the lever may be moved in the other direction to fold to inoperative position between said frame members.

4. A truck for use in applying or removing tires and wheels, comprising a bifurcated frame, wide at one end and narrowed at the other, roller means carried by said frame at its wide end, a handle pivoted to swing between the frame members at its narrow end, and laterally extending abutment means carried by said handle at its inner end, adapted to bear against the edges of the frame at its narrow end, and to lock the handle against further pivotal movement in one direction.

5. A truck for use in applying or removing tires and wheels, comprising two arms forming a bifurcated frame member for receiving the tire or wheel, roller means journaled in said arms at the extreme ends thereof, an operating lever member pivoted to said frame member at the other ends of said arms, and laterally extending abutment means, rigidly carried by and movable with one of said members and engageable with the other member, whereby a lifting force applied to the outer end of said lever member locks the two members against further pivotal movement and serves to lift the frame member and to lift the tire or wheel positioned thereon.

GEORGE F. BROWN.

REFERENCES CITED

The following references are of record in the file of this patent:

UNITED STATES PATENTS

| Number | Name | Date |
|---|---|---|
| 1,363,499 | Davis | Dec. 28, 1920 |
| 1,892,979 | Clark | Jan. 3, 1933 |
| 2,139,470 | Schmeiser | Dec. 6, 1938 |
| 2,207,443 | Schneider | July 9, 1940 |
| 2,318,108 | Schramm | May 4, 1943 |
| 2,345,458 | Caron | Mar. 28, 1944 |